United States Patent
Webb et al.

[19]

[11] Patent Number: 6,130,505
[45] Date of Patent: Oct. 10, 2000

[54] AUTOMATIC ALIGNMENT OF CATHODE RAY TUBE VIDEO DISPLAYS IN LOCAL MAGNETIC FIELDS

[75] Inventors: James R. Webb, Boulder; Ron C. Simpson, Erie, both of Colo.

[73] Assignee: Display Laboratories, Inc., Boulder, Colo.

[21] Appl. No.: 08/908,623

[22] Filed: Aug. 8, 1997

Related U.S. Application Data

[60] Provisional application No. 60/053,393, Jan. 16, 1997.
[51] Int. Cl.[7] .................................................. H01J 29/54
[52] U.S. Cl. .............................................. 315/8; 315/370
[58] Field of Search .................................. 315/8, 85, 370

[56] References Cited

U.S. PATENT DOCUMENTS

| | | | |
|---|---|---|---|
| 4,388,619 | 6/1983 | Beck | 315/371 |
| 4,725,763 | 2/1988 | Okuyama | 315/368 |
| 4,851,775 | 7/1989 | Kim | 324/247 |
| 5,565,897 | 10/1996 | Kikinis et al. | 345/213 |
| 5,583,401 | 12/1996 | Inoue et al. | 315/8 X |
| 5,847,511 | 12/1998 | Lee | 315/8 |

*Primary Examiner*—Justin P. Bettendorf
*Attorney, Agent, or Firm*—William W. Cochran; Merchant & Gould

[57] ABSTRACT

A system and method for dynamic adjustment of video images on a cathode ray tube in diverse geographic local magnetic fields. The present invention uses a CRT magnetometer that accurately senses differences in the strength and direction of a local magnetic field in three axes, i.e., the x, y, and z axes. The cathode ray tube includes a digital monitor board or monitor circuitry that has a processor and memory and is capable of retrieving correction factor data and magnetic correction data generated by a vision system. The digital monitor board receives CRT magnetometer signals and uses the signals with magnetic correction data to adjust the correction factor data to generate locale specific correction factor data for the sensed local magnetic field. The digital monitor board is capable of decoding the locale specific correction factor data using DACs, PDMs, PWMs, and interpolation engines to generate correction signals that are used to adjust the video image to correct for magnetically induced distortion.

22 Claims, 7 Drawing Sheets

AUTOMATIC ALIGNMENT OF CATHODE RAY TUBE VIDEO DISPLAYS IN LOCAL MAGNETIC FIELDS

CROSS REFERENCE TO RELATED APPLICATIONS

This application is based on and claims the benefit of provisional application Ser. No. 60/053,393, filed Jan. 16, 1997.

BACKGROUND OF THE INVENTION

A. Field of Invention.

This invention pertains generally to the adjustment of a video image on a cathode ray tube and more particularly to alignment of a video image on a cathode ray tube in various magnetic fields.

B. Definitions.

Align means to cause a video image to be adjusted so that distortion characteristics are reduced and the video image that is displayed on the cathode ray tube forms an image that is pleasing to the eye.

Calibrated magnetic field strength signal means the signal or data representative of the actual magnetic field as measured by a calibrated magnetometer.

Calibration magnetometer means a magnetometer used to measure magnetic field strength and direction and generate calibrated magnetic field strength signals representative of the actual magnetic field.

Cathode ray tube means a device that is capable of displaying an image that uses a magnetically deflected electron beam. A cathode ray tube may include one or more of the following: the tube structure, the phosphor screen, the neck of the tube, the deflection and control windings, including the yoke, rotation and other coils, and the electron guns.

Characterization module means a device that is normally coupled in some manner to a cathode ray tube and may include a storage device for storing correction factor data and/or magnetic correction factor data. The characterization module can also store term multipliers, gain matrix tables, magnetic gain matrix tables, magnetic correction data formulas, or other data for use in aligning displays including cathode ray tube monitors.

Correction factor data means the encoded digital bytes or any other form of data or signals, such as term multipliers that are used to modify standardized transformation equations, that are representative of the amount of correction required to adjust the correction factor parameters to substantially align a video image on a cathode ray tube.

Correction factor parameters means the various geometry characteristics of the cathode ray tube including horizontal size, raster rotation, vertical size, horizontal center, vertical center, pincushioning, vertical linearity, keystoning, convergence, etc., and various electron gun characteristics of the cathode ray tube including contrast, brightness, luminosity, focus, color balance, color temperature, electron gun cutoff, etc., as well as other adjustments to a cathode ray tube.

Correction signals means any signals generated by monitor circuitry that can be used in the process of aligning a video image on a cathode ray tube.

CRT magnetometer means a magnetometer associated with a cathode ray tube that senses the magnetic field data surrounding the cathode ray tube and generates noncalibrated magnetic field strength signals.

Decoder means a device for interpreting encoded correction factor data and locale specific correction factor data and generating a signal or data in response. Decoders may include PWMs, PDMs, DACs, interpolation engines, screen display chips, or other similar devices.

Driver signals are the electrical signals that are used to drive the deflection and control windings and electron guns of a cathode ray tube.

Dynamically adjusting means to alter or change correction factor parameters during the course of a scan.

Induced magnetic field means the magnetic field generated by a magnetic field generator.

Local magnetic field means the magnetic field surrounding a cathode ray tube device that does not include the induced magnetic field produced by a magnetic field generator.

Locale specific correction factor data means data or signals representative of the amount of correction required to align a video signal on a cathode ray tube in a magnetic field. The locale specific correction factor data may be in the form of term multipliers that are used to modify standardized transformation equations as disclosed in U.S. Pat. No. 5,216,504 issued Jun. 1, 1993, entitled "Automatic Precision Video Monitor Alignment System", or as a magnetic gain matrix table or a magnetic correction data formula which can be used to modify correction factor data obtained by screen mapping using a vision system as disclosed in U.S. patent application Ser. No. 08/638,222 filed Apr. 26, 1996, entitled "Screen Mapping of a Cathode Ray Tube", or other devices.

Logic device means a microprocessor, a state machine, a digital signal processor or other logic devices.

Magnetic correction data means the data or signals that can be used to alter correction factor data to generate locale specific correction factor data. Magnetic correction data is representative of the amount of correction required for various correction factor parameters in various magnetic fields.

Magnetic correction data formula means a mathematical representation of the variation of various correction factor parameters as a function of the variation in the local magnetic field.

Magnetic distortion means the amount of distortion of a substantially aligned image due to a magnetic field.

Magnetic field means a local magnetic field and/or an induced magnetic field.

Magnetic field generator means a device for altering and/or controlling the magnetic field surrounding a cathode ray tube.

Magnetic field state means the magnitude of the three-dimensional components of the magnetic field surrounding a cathode ray tube.

Magnetic field strength signals means the signals or data representative of the three-dimensional components of a magnetic field and may take the form of a calibrated and/or noncalibrated magnetic field strength signal.

Magnetic gain matrix table means a table used to indicate how correction factor data, for each correction factor parameter, can be altered to compensate for changes in a magnetic field to maintain alignment of a video image display. The table may comprise noncalibrated magnetic field strength signals and associated magnetic correction data.

Memory comprises any desired storage medium including, but not limited to, EEPROMs, RAM, EPROMs, PROMs, ROMs, magnetic storage, magnetic floppies, bar codes, serial EEPROMs, flash memory, etc.

Monitor circuitry means one or more circuits that generate correction signals, including driver signals to align a cathode ray tube in response to locale specific correction factor data. Monitor circuitry is not necessarily located in the cathode ray tube monitor but can be located external thereto, or in any other device.

Noncalibrated magnetic field strength signal means the signal or data representative of a magnetic field measured by a noncalibrated or production grade magnetometer.

Nonvolatile storage device means a memory device that is capable of storing data that does not require a constant supply of power.

Processor means a logic device including, but not limited to, state machines, microprocessors, digital signal processors, etc.

Term multipliers means factors generated by measuring distortion characteristics of a cathode ray tube for use with transformation equations to produce a correction signal.

Transformation equation means a standard form equation for producing a correction voltage waveform to correct common distortion characteristics of a cathode ray tube.

Video image means the displayed image that appears on a cathode ray tube screen.

Vision system means a system for measuring distortion characteristics and producing correction factor data and magnetic correction data that is used for aligning or adjusting video images on a cathode ray tube. The use of a vision system is described, for example, in U.S. Pat. No. 5,216,504.

C. Description of the Background.

Recent developments in the measurement of distortion and the adjustment of video images on cathode ray tube devices, including computer monitors and digital television displays, have made it possible and desirable to correct video displays for various types of distortion. Magnetically induced distortion has not previously been corrected for local magnetic variations. For example, the effect of earth's magnetic field on a video image varies significantly with both geographic location and the orientation of the cathode ray tube relative to the earth magnetic field. Although attempts have been made through monitor design to minimize magnetically induced distortion effects, these efforts are at best a compromise and usually provide less than desirable results. Correcting magnetic distortion is an important factor in providing overall distortion correction, since most correction factor parameters vary with the magnetic operating environment of the monitor.

Heretofore, cathode ray tube devices were calibrated at the factory for the general geographic location in which they were expected to be used. For example, a manufacturer might have separate calibration standards for North America, Europe, Australia, etc. This method is inherently limited, because the same calibration is applied over a wide geographic area and does not address field orientation or local magnetic variations. However, magnetic distortion often varies significantly with the orientation of the cathode ray tube and with the local magnetic field. For example, it is not uncommon for the alignment of a monitor to change significantly by simply rotating the monitor through 90 degrees or using the monitor in a different area of the country. Since prior art devices have been unable to correct for local magnetic distortion, it would therefore be desirable to provide a system and method to accurately maintain the alignment of a cathode ray tube video display in a wide range of magnetic field operating environments.

SUMMARY OF THE INVENTION

The present invention overcomes the disadvantages and limitations of the prior art by providing a system and method that generates magnetic correction data, in response to measured local magnetic fields, that is used to modify the correction factor data to generate locale specific correction factor data. Locale specific correction factor data is then used by monitor circuitry to align the cathode ray tube video display.

The present invention may therefore comprise a system for aligning video images on a cathode ray tube in various local magnetic fields comprising, a CRT magnetometer that measures the various local magnetic fields and generates noncalibrated magnetic field strength signals, a processor that generates magnetic correction data in response to the noncalibrated magnetic field strength signals and modifies correction factor data with the magnetic correction data to produce locale specific correction factor data, and monitor circuitry that generates driver signals from the locale specific correction factor data and applies the driver signals to the cathode ray tube to align video images on the cathode ray tube.

The present invention may also comprise a method of generating magnetic correction data representative of the amount of correction required for aligning video images on a cathode ray tube comprising the steps of, generating induced magnetic fields to produce a plurality of magnetic field states using a magnetic field generator, measuring magnetic distortion for the plurality of magnetic field states using a vision system by determining the amount of distortion that is produced for various correction factor parameters, producing magnetic correction data from the magnetic distortion measured by the vision system that is representative of the amount of correction required for various correction factor parameters for various magnetic fields.

The advantages of the present invention are that locale specific correction factor data is generated that provides an accurate method of aligning video images in a wide variety of magnetic field environments. The system is capable of measuring local magnetic fields to address previously stored magnetic field correction data that is, in turn, used to generate locale specific correction factor data from cathode ray tube correction factor data. A digital monitor board then uses the locale specific correction factor data to align the video image, as more fully disclosed by U.S. patent application Ser. No. 08/638,222 filed Apr. 26, 1996 by James R. Webb et al. entitled "Screen Mapping of a Cathode Ray Tube", and U.S. patent application Ser. No. 08/611,098 filed Mar. 5, 1996 by James R. Webb et al. entitled "Method and Apparatus for Making Corrections in a Video Monitor", U.S. Pat. No. 5,216,504, U.S. Pat. No. 5,504,521 and U.S. Pat. No. 5,510,833, which are specifically incorporated herein for all that they disclose and teach. Unlike prior attempts to compensate for magnetic distortion through design compromise, the present invention allows accurate automatic correction of magnetic distortion at whatever location or orientation a cathode ray tube is used and greatly simplifies the production and calibration of cathode ray tube devices. The present invention not only offers significant technical advantages but economic benefits also.

DETAILED DESCRIPTION OF THE PREFERRED EMBODIMENT OF THE INVENTION

Figure 1:
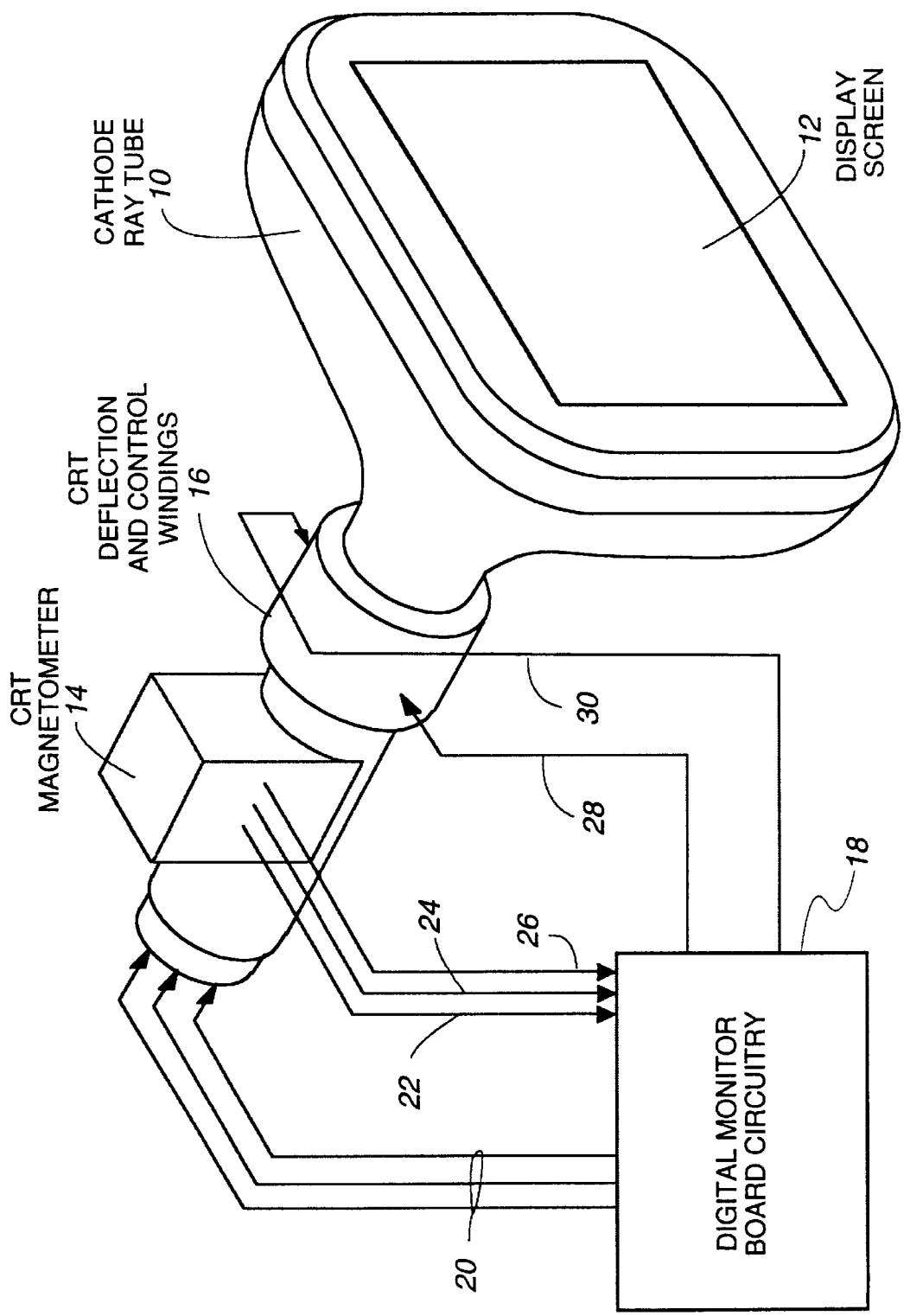
FIG. 1 is a schematic illustration of a CRT magnetometer mounted on a cathode ray tube and associated monitor board circuitry.

FIG. 1 discloses a cathode ray tube 10 having a CRT magnetometer 14 mounted on the neck of cathode ray tube 10. Also illustrated in FIG. 1 are the cathode ray tube video display screen 12, the cathode ray tube deflection and control windings 16, and digital monitor board circuitry 18. Numerous and complex interrelationships exist between the various horizontal and vertical correction factor parameters (scan geometries) in cathode ray tube image displays and these relationships can be measured and characterized by correction factor data for video image alignment. Correction factor data can be derived as disclosed in U.S. Pat. No. 5,216,504 issued to James R. Webb et al. entitled "Automatic Precision Video Alignment System" that describes the use of a vision system to measure cathode ray tube distortion characteristics. When correction factor data is obtained with a vision system it is stored as correction factor data in a memory (e.g., characterization module, disk, etc.) for later association with the cathode ray tube 10. This correction factor data can then be used by digital monitor board circuitry 18 or other external circuitry to generate correction signals and apply driver signals to align a video image on display screen 12 as disclosed in U.S. patent application Ser. No. 08/638,222 filed Apr. 26, 1996 by James R. Webb et al. entitled "Screen Mapping of a Cathode Ray Tube", U.S. patent application Ser. No. 08/613,902 filed Mar. 11, 1996 by Ron C. Simpson entitled "Interpolation Engine for Generating Font Gradients", and U.S. patent application Ser. No. 08/611,098 filed Mar. 5, 1996 now U.S. Pat. No. 5,739,870 by James R. Webb et al. entitled "Method and Apparatus for Making Corrections in a Video Monitor", which are specifically incorporated herein by reference for all that they disclose and teach. As disclosed herein, similar techniques can be used to generate and store locale specific correction factor data to be used for aligning cathode ray tube video displays in various local magnetic fields. Magnetic correction data, generated by vision system 38 (FIG. 2) and stored during a cathode ray tube calibration process, in either a magnetic gain matrix table or in the form of one or more magnetic correction data formulas, is retrieved and used by digital monitor board circuitry 18, in conjunction with correction factor data and noncalibrated magnetic field strength signals from CRT magnetometer 14, to generate the locale specific correction factor data. The locale specific correction factor data is representative of the correction required to align cathode ray tube 10 for the specific local magnetic field environment in which the cathode ray tube 10 is located. Locale specific correction factor data is interpreted by correction and driver circuitry 74 (FIG. 4) to generate correction signals that align the cathode ray tube video display, as disclosed in the above referenced patent applications. The locale specific correction factor data may be regenerated any time the CRT magnetometer 14 senses a change in the local magnetic field, but typically, the locale specific correction factor data is generated when the cathode ray tube monitor is switched-on, or whenever the cathode ray tube goes through a degaussing cycle. This results in the periodic adjustment of the video image on cathode ray tube 10 in various magnetic field environments.

In operation, CRT magnetometer 14 transmits noncalibrated magnetic field strength signals, representative of the three dimensional components of the local magnetic field, to the digital monitor board circuitry via lines 22, 24, and 26, respectively. The digital monitor board circuitry 18 uses the noncalibrated magnetic field strength signals and stored magnetic correction data to modify the correction factor data and generate locale specific correction factor data. This locale specific correction factor data is then used by digital monitor board circuitry 18 to generate and apply driver signals as disclosed in the above referenced patents and patent applications. The driver signals are transmitted to cathode ray tube deflection and control windings 16 via signal connections 28 and 30. Electron gun driver signals are synchronously transmitted to the CRT electron guns via connectors 20.

Figure 2:
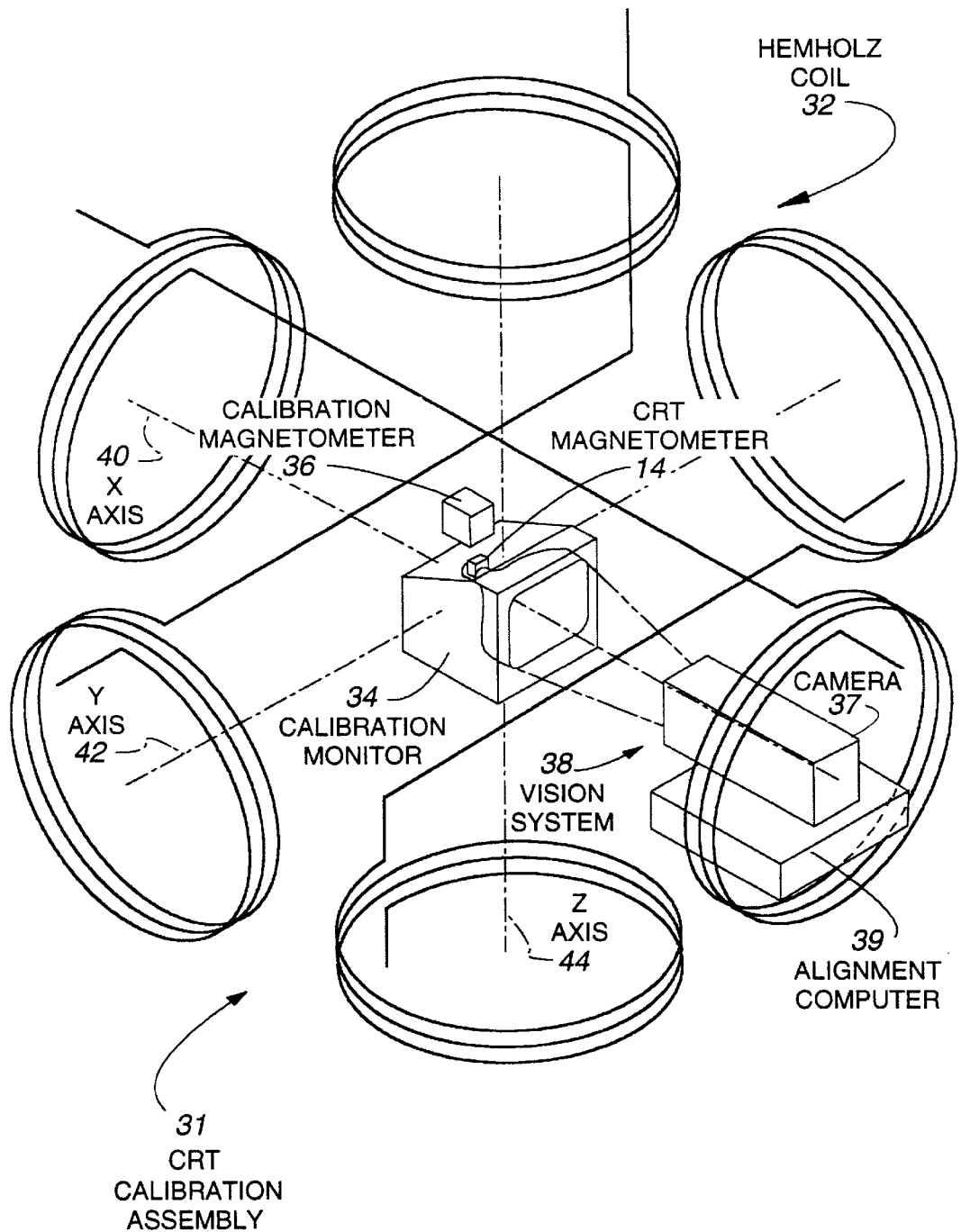
FIG. 2 schematically illustrates the manner in which a Helmholtz coil is used in the calibration of the present invention.

FIG. 2 is a schematic illustration of a cathode ray tube calibration assembly 31 used to generate magnetic field correction data. A cathode ray tube calibration monitor 34 is centered and carefully oriented with respect to the x-axis 40, y-axis 42, and z-axis 44 of Helmholtz coil 32. Helmholtz coil 32 is of sufficient size to produce a substantially uniform magnetic field in the area of calibration monitor 34. Calibration monitor 34 is monitored by camera 37 which is a part of vision system 38. Data is recorded and processed by an associated alignment computer 39 which is also part of the vision system 38. The magnetic field environment within the Helmholtz coil 32 is continually measured by calibration magnetometer 36 that provides a calibrated magnetic field strength signal that is representative of the actual calibrated magnetic field strength in each axis inside the Helmholtz coil 32. These calibrated magnetic field strength signals are used by alignment computer 39 to vary the magnetic field in Helmholtz coil 32 in the manner disclosed below. Noncalibrated magnetic field strength signals generated by CRT magnetometer 14 are recorded by alignment computer 39, together with magnetic correction data generated by vision system 38. The use of a vision system 38 is more completely disclosed in U.S. Pat. No. 5,216,504 issued to James R. Webb et al. entitled "Automatic Precision Video Alignment System" that describes the use of a vision system to measure cathode ray tube distortion characteristics and is specifically incorporated above.

Figure 3:
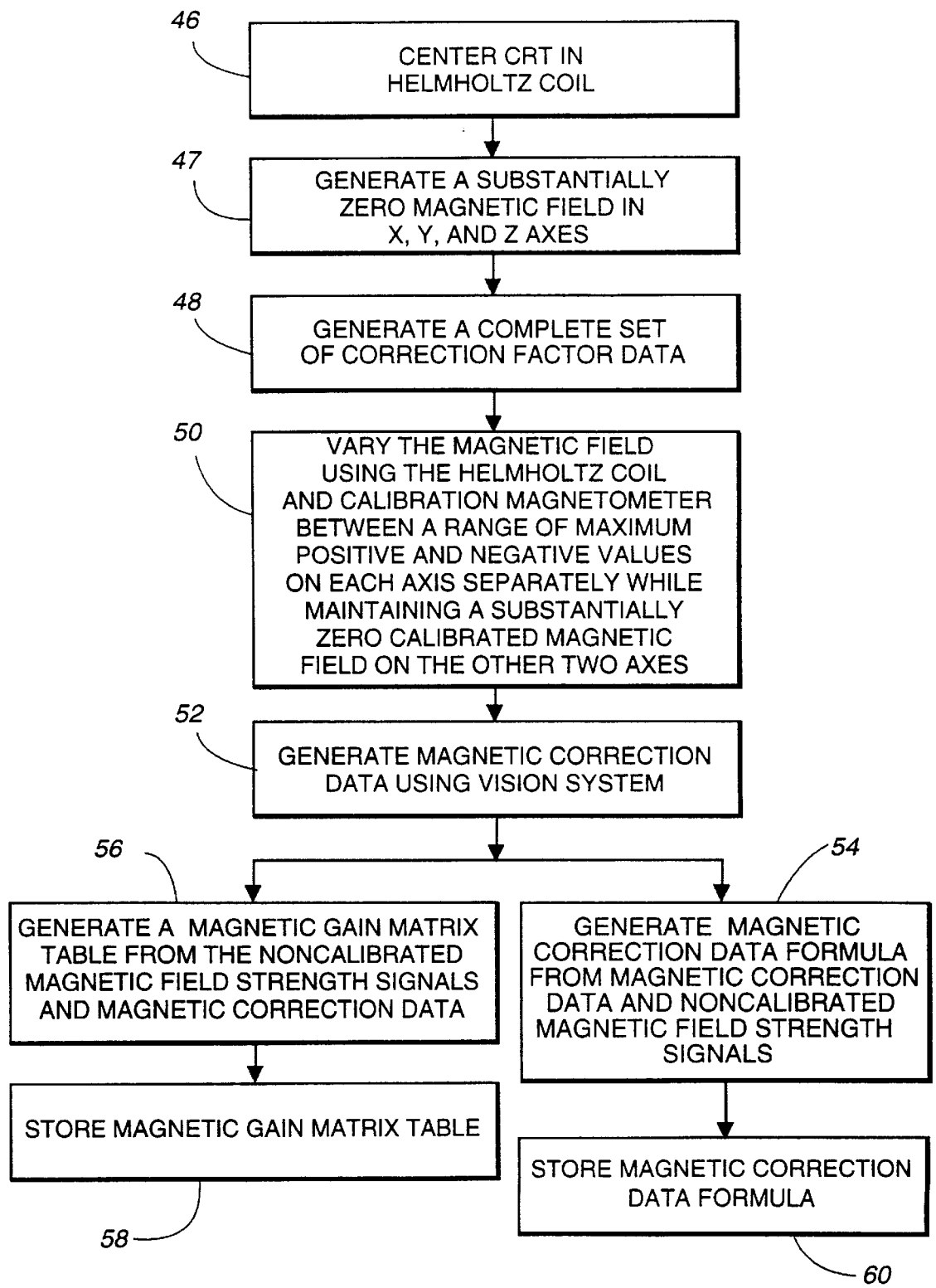
FIG. 3 is a schematic flow diagram that illustrates the steps of using a vision system and Helmholtz coil to calibrate the present invention and generate magnetic field correction data.

FIG. 3 discloses the steps of using the calibration assembly 31 (FIG. 2) for generating magnetic correction data. In step 46, a cathode ray tube calibration monitor 34 (FIG. 2) of the type, model and size for which the magnetic field correction data is to be generated is placed in the center of Helmholtz coil 32 (FIG. 2). The calibration monitor cathode ray tube display is viewed by camera 37 (FIG. 2). The Helmholtz coil 32 is initially adjusted so that the calibration monitor resides in a substantially zero magnetic field in the x, y, and z axes in step 47. In step 48, with the local magnetic field canceled, the vision system is used to generate a complete set of correction factor data covering each correction factor parameter for the cathode ray tube calibration monitor using one of the procedures fully described in U.S. Pat. No. 5,216,504 issued to James R. Webb et al. entitled "Automatic Precision Video Alignment System" or U.S. patent application Ser. No. 08/638,222 filed Apr. 26, 1996 by James R. Webb et al. entitled "Screen Mapping of a Cathode Ray Tube", and U.S. patent application Ser. No. 08/611,098 filed Mar. 5, 1996 by James R. Webb et al. entitled "Method and Apparatus for Making Corrections in a Video Monitor" that describes the use of a vision system to measure cathode ray tube distortion characteristics and generate correction factor data.

In step 50, the magnetic field in each axis (x, y, and z) is individually modified by Helmholtz coil 32 to predetermined calibration values as indicated by the calibrated magnetic field strength signal generated by calibration magnetometer 36 in a range between a selected positive maximum value and a selected maximum negative value. Then, a number of different calibration points are selected in the preselected range of the calibrated magnetic field strength signals for each axis. A complete set of magnetic correction data for each correction factor parameter is obtained for each calibration point using the vision system 38 as indicated at step 52. The vision system determines the amount of correction required for each correction factor parameter at each calibration point. This amount of correction is recorded as the magnetic correction data. Alternatively, magnetic correction data can be generated between two or more values of the calibrated magnetic field strength using an interpolation engine as disclosed below. The calibration magnetometer 36 (FIG. 2) and the CRT magnetometer 14 are configured so that noncalibrated magnetic field strength signals from CRT magnetometer 14 are recorded with the magnetic correction data that is generated by the alignment computer 39 (FIG. 2). For example, a positive maximum magnetic field is set on the x-axis and all the relevant magnetic correction data is recorded for each correction factor parameter. A maximum negative magnetic field is then produced on the x-axis and all the magnetic correction data for each correction factor parameter is recorded. This procedure is then repeated for the desired number of calibrated magnetic field strength values in the desired range of magnetic field strength values for the x-axis. During the x-axis calibration, the y and z axes magnetic fields are held at a substantially zero value. Once all of the x-axis data is obtained, data is similarly captured for both the y and z axes, while the fields on the two inactive axes are held at a null value.

The interpolation engine disclosed in U.S. patent application Ser. No. 08/613,902 filed Mar. 11, 1996 now U.S. Pat. No. 5,739,870 entitled "Interpolation Engine for Generating Font Gradients" which is incorporated above, can be used to generate additional magnetic correction data points that comprise interpolated values falling between the measured magnetic correction data points. These interpolated data points can then comprise a full set of magnetic correction data that can be used to generate locale specific correction factor data.

Once a complete set of magnetic correction data for each correction factor parameter has been obtained in each axis for a plurality of magnetic field strengths, it is possible, in step 54, to empirically generate a magnetic correction data formula that is a mathematical representation of the variation in each correction factor parameter as a function of the change in the noncalibrated magnetic field strength signal in the x, y, and z axes of the CRT magnetometer 14. Alternatively, a gain matrix table can be generated at step 56 that relates the variation of each correction factor parameter for the noncalibrated magnetic field strength in each of the x, y and z axes to produce a magnetic gain matrix table.

After the magnetic gain matrix table or a magnetic correction data formula has been generated, they are stored in RAM 62 (FIG. 4) at step 58 or step 60, respectively. The magnetic correction data can be retrieved from the gain matrix table or magnetic correction data formula, and used by a production cathode ray tube monitor, having a similar CRT magnetometer, to modify the correction factor data for local magnetic fields and align the cathode ray tube video image display. The gain matrix table or magnetic correction data formula may be stored in a characterization module on a production cathode ray tube, or in memory associated with the digital monitor board circuitry, or in other storage for later retrieval and use. In some situations the magnetic field correction data might be stored in the form of term multipliers. These term multipliers can then be applied to transformation equations stored by the digital monitor board 18 (FIG. 1) to generate local specific correction factor date 72 (FIG. 3).

Figure 4:
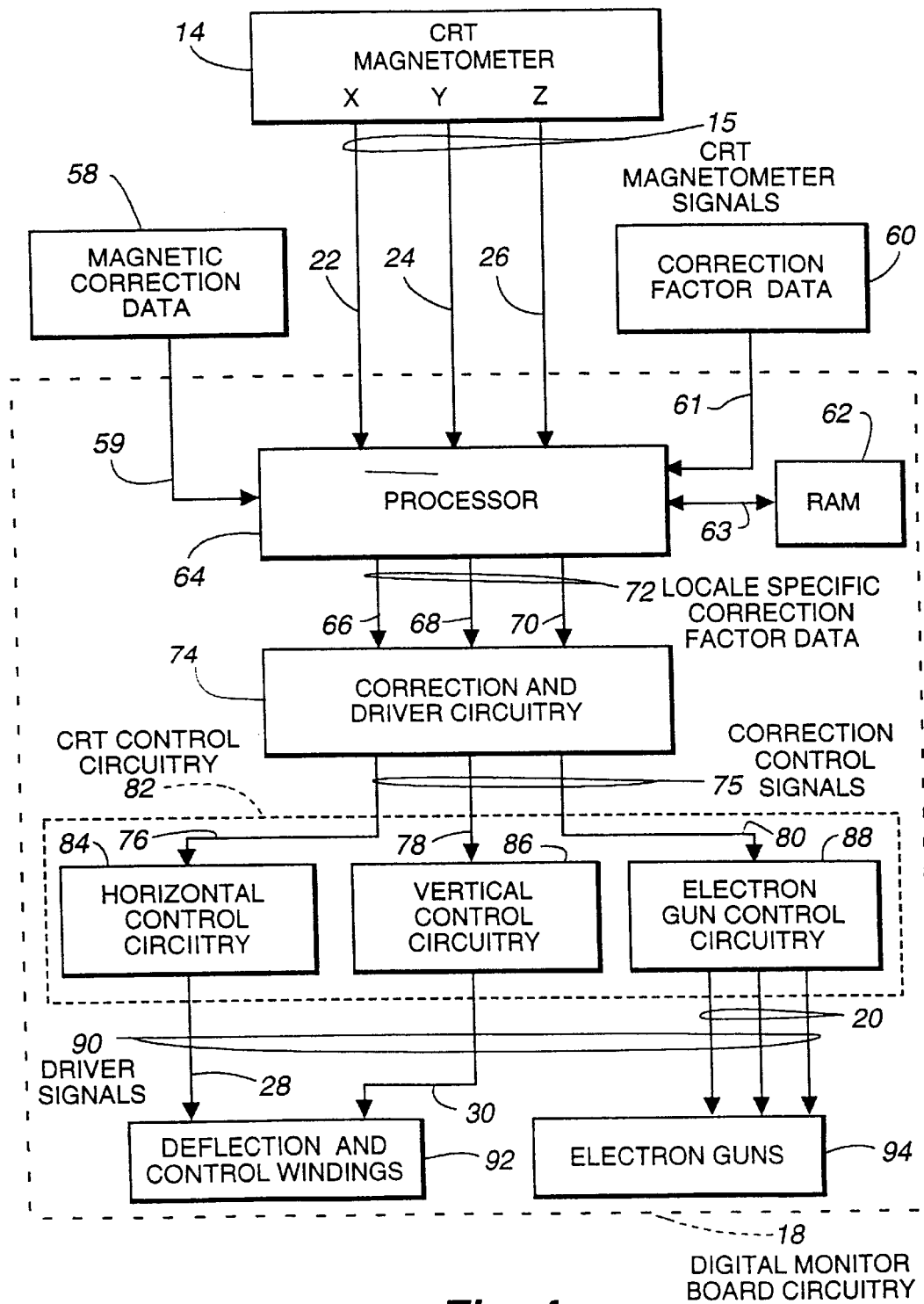
FIG. 4 is a schematic block diagram of the components of the present invention.

FIG. 4 discloses a schematic block diagram of the components of the present invention as implemented in a production cathode ray tube monitor having a CRT magnetometer 14 that corresponds to CRT magnetometer 14 of FIG. 2. CRT magnetometer 14 senses the local magnetic environment and transmits noncalibrated magnetic field strength signals, representative of the three dimensional local magnetic field, to processor 64, via connections 22, 24, and 30 respectively. Processor 64 retrieves correction factor data from storage 60 via connection 61 and noncalibrated magnetic field strength signals for the local magnetic field, as measured by CRT magnetometer 14, from storage 58 via connection 59. Processor 64 also communicates with RAM 62 via connection 63. Processor 64 generates locale specific correction factor data 72 using correction factor data and magnetic correction data retrieved in response to the local magnetic field data generated by CRT magnetometer 14. The locale specific correction factor data is transmitted to the correction and driver circuitry 74 on the digital monitor board 18 via connectors 66, 68, and 70 where the locale specific correction factor data is decoded and conditioned to produce control signals 75. Control signals are then transmitted to the cathode ray tube control circuitry 82 via connections 76, 78, and 80. Cathode ray tube control circuitry 82 comprises horizontal control circuitry 84, vertical control circuitry 86 and electron gun control circuitry 88. Cathode ray tube control circuitry 82 generates driver signals 90 that are transmitted to the cathode ray tube deflection and control windings 92 via lines 28 and 30. RGB (red, green and blue) video driver signals that are generated by electron gun control circuitry 88 are transmitted to the cathode ray tube electron guns via RGB connector 20.

In operation, whenever the production cathode ray tube device of the present invention is switched on or degaussed, a CRT magnetometer 14 senses the local magnetic field components in three dimensions and generates noncalibrated magnetic field strength signals representative of the strength of the local magnetic field adjacent to the cathode ray tube device. The noncalibrated magnetic field strength signals 15 produced by CRT magnetometer 14 are transmitted via connections 22, 24 and 26 to a processor 64 that is associated with digital monitor board circuitry 18. Processor 64 uses the magnetic correction data 58, retrieved from the magnetic gain matrix table or magnetic correction data formula, to modify the correction factor data 60 and, in turn, generate locale specific correction factor data 72. The correction factor data 60 available to processor 64, via connection 61, characterizes the cathode ray tube and is normally generated at the time of manufacture. The correction factor data 60 is representative of the amount of correction required to align a video signal on that cathode ray tube and is generated, for a plurality of correction factor parameters, in a calibrated magnetic field, as disclosed above.

Once processor 64 has generated the necessary locale specific correction factor data 72 to accommodate for the local magnetic field, as shown in FIG. 4, the locale specific correction factor data 72 is transmitted to the correction and driver circuitry 74. The correction and driver circuitry 74 includes decoders such as DACs, pulse width modulators, pulse density modulators, and interpolation engines, etc., that are used to decode and generate the correction control signals 75 which are, in turn, used to align the video image display. The use of decoders such as DACs, pulse width modulators, pulse density modulators and interpolation engines to interpret and apply correction factor data is more fully disclosed in the above referenced patents and patent applications.

As also shown in FIG. 4, the correction control signals 75 generated by correction and driver circuitry 74 are transmitted to the cathode ray tube control circuitry 82 via connections 76, 78, and 80. The cathode ray tube control circuitry selectively applies the correction control signals 75 to the horizontal control circuitry 84, the vertical control circuitry 86, and the electron gun circuitry 88 to generate the driver signals 90 required to align the video display. The driver signals 90 are applied to the deflection and control windings 92, via connections 28 and 30, and to the electron guns 94 via connectors 20. Again, the use of correction factor data, correction control signals and driver signals to automatically align cathode ray tube video displays is fully disclosed in the patents and patent applications referenced above.

Figure 5:
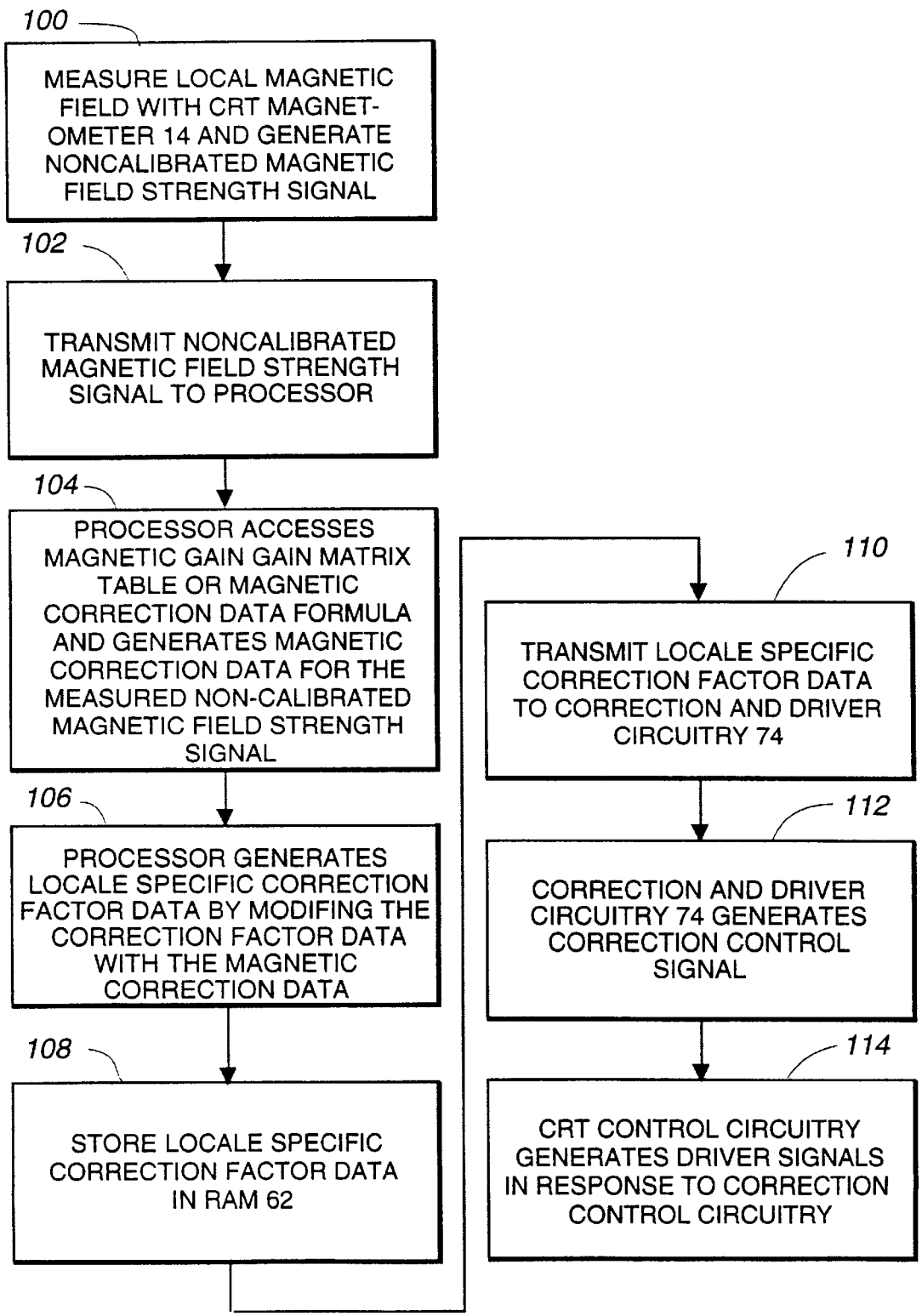
FIG. 5 is a schematic flow diagram that describes the operation of the present invention in a production cathode ray tube device.

FIG. 5 is a flow chart of the steps for implementing the present invention to align a video image. In step 100, a cathode ray tube 10 having a CRT magnetometer 14 is switched-on in a local magnetic field. When first switched-on, the cathode ray tube is automatically degaussed, and then the local magnetic field operating environment is sensed by CRT magnetometer 14 in the x, y, and z axes, relative to the orientation and location of the cathode ray tube 10. Noncalibrated magnetic field strength signals are then transmitted to a processor on the digital monitor board in step 102. The magnetometer 14 generates noncalibrated magnetic field strength signals and transmits these signals to the digital monitor board. In step 104 the digital monitor board processor retrieves both the correction factor data and the magnetic correction data. The processor may use the noncalibrated magnetic field strength signals as an address in a look-up table to access the magnetic correction data or may use the noncalibrated magnetic field strength signals in the magnetic correction data formula to produce the magnetic correction data. The magnetic correction data is then used to modify the correction factor data in step 106 to generate a set of locale specific correction factor data for each correction factor parameter required to automatically align the cathode ray tube video image in the measured local magnetic environment.

In step 108 of FIG. 5, the locale specific correction factor data is stored in RAM 62 on the digital monitor board 18. In step 110 the local specific correction factor data is transmitted to the correction and driver circuitry 74, where it is decoded, integrated and/or filtered to generate the correction control signals 75 necessary for the alignment process as indicated in step 112. In step 114, the correction control signals generated by the correction and driver circuitry are transmitted to cathode ray tube control circuitry 82 where the correction control signals 75 are used to generate driver signals 90 that are transmitted along with the video signal to the cathode ray tube deflection and control windings 92 and the electron guns 94. The driver signals 90 are generated from locale specific correction factor data 72 that is created by sensing the local magnetic field of the surrounding cathode ray tube 10. The use of a vision system to generate correction factor data that can be appropriately altered for a local magnetic field allows video images to be aligned in diverse geographic locations having a wide range of magnetic field environments.

Figure 6:
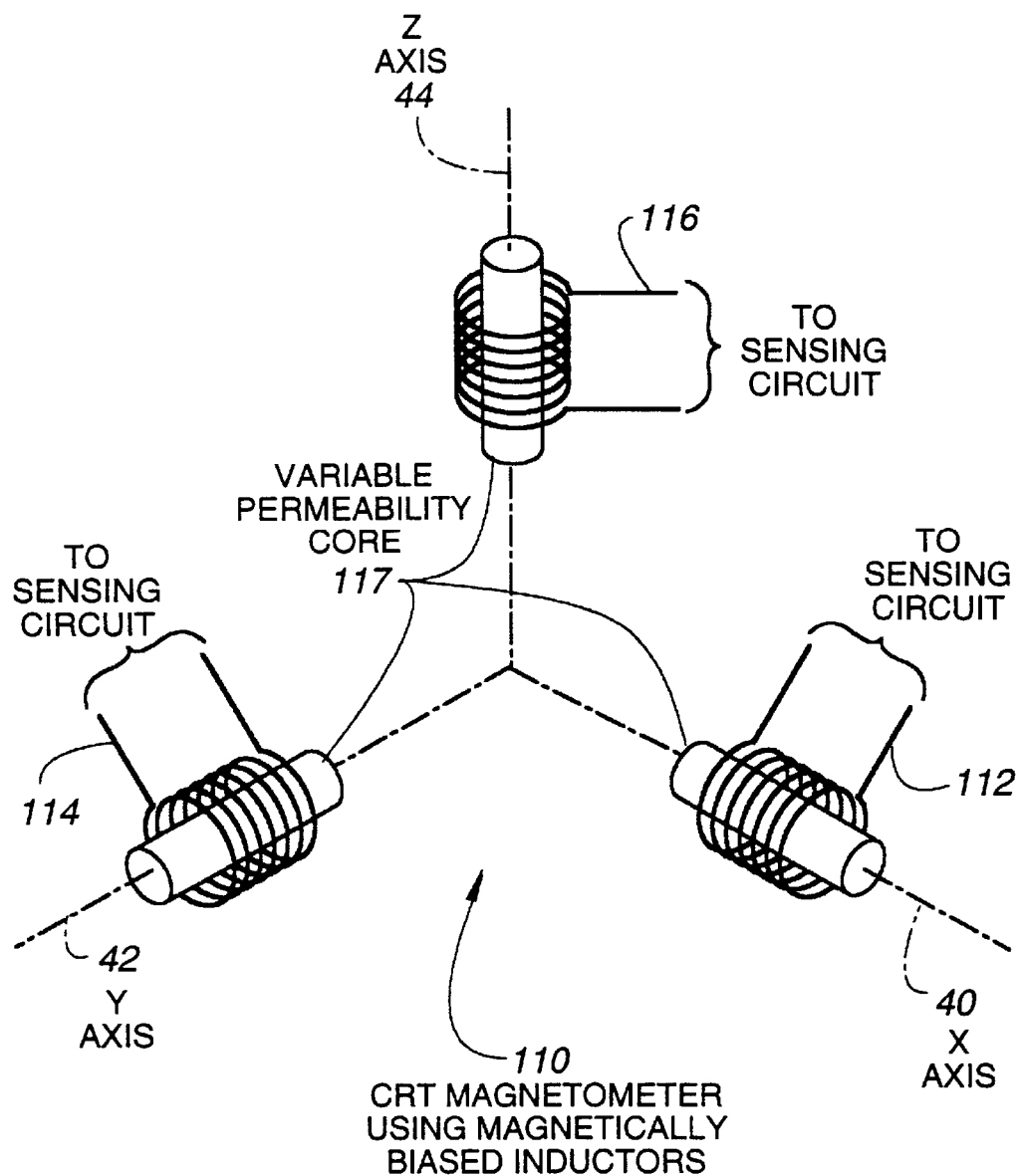
FIG. 6 schematically illustrates a three axis CRT magnetometer.

FIG. 6 is a schematic diagram of a magnetically biased CRT magnetometer 110, which is one type of three axis magnetometer that can be used as a CRT magnetometer 14 in accordance with the present invention. The magnetically biased CRT magnetometer comprises three inductors 112, 114, and 116. Each inductor is oriented at approximately a 90 degree relative angle and thus defines the x, y, and z axes 40, 42 and 44, for the magnetometer and the cathode ray tube 10, once the CRT magnetometer 14 is attached to the cathode ray tube 10, even though the specific alignment of CRT magnetometer 14 with any portion of the cathode ray tube 10 may not be required. Each inductor 112, 114, and 116 is wound around a core of variable permeability material 117 that is magnetically biased by the local magnetic environment and is sensed by a separate oscillator circuit illustrated in FIG. 7. Measuring the inductance of each inductor 112, 114, and 116 with an alternating current provides a very sensitive evaluation of both the strength and direction of any changes in the local magnetic field. The use of variable permeability magnetometers is more fully described by U.S. Pat. No. 4, 851,775 entitled "Digital Compass and Magnetometer Having a Sensor Coil Wound on a High Permeability Isotropic Core" issued Jul. 25, 1989 to Nam H. Kim et al., which is specifically incorporated herein by reference for all that it discloses and teaches.

Figure 7:
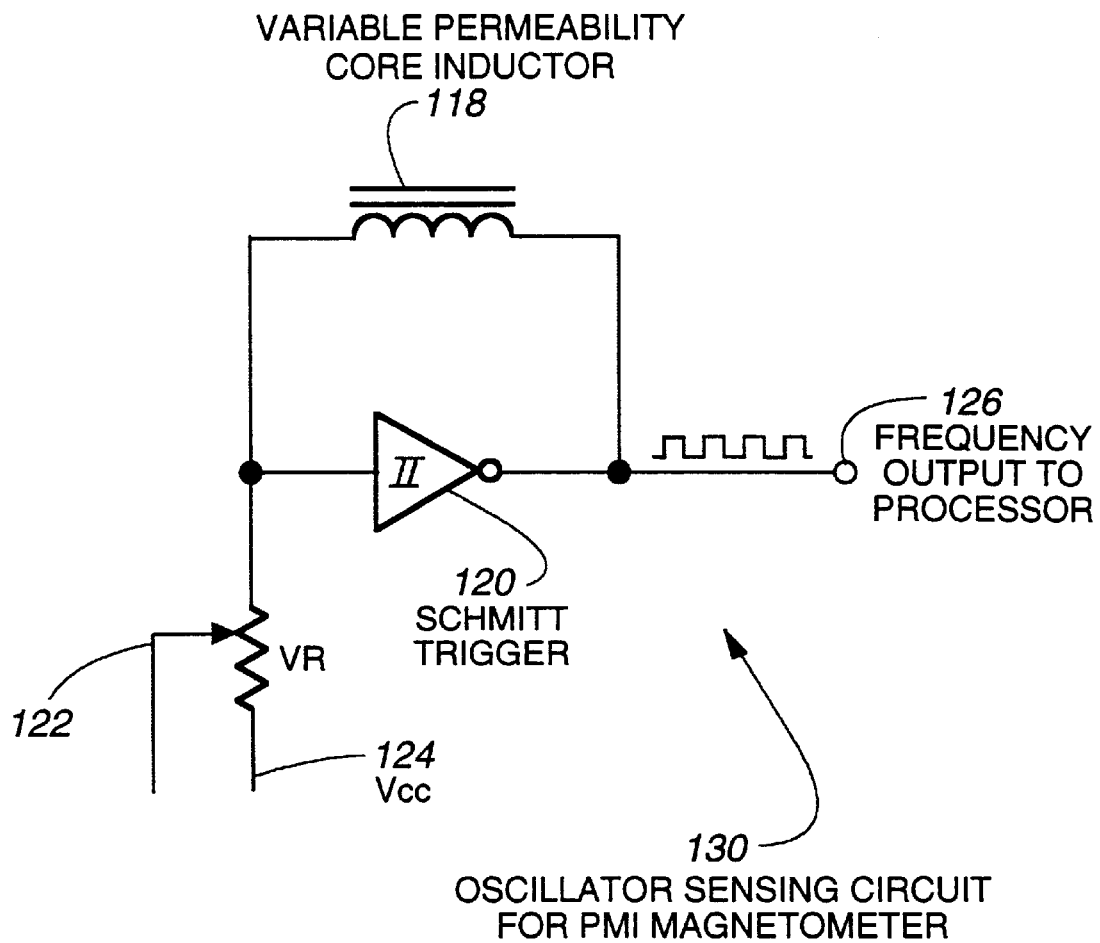
FIG. 7 is a schematic circuit diagram of a simple sensing circuit for a magnetically biased CRT magnetometer.

FIG. 7 is a schematic circuit diagram of one type of simple sensing circuit that can be used with the CRT magnetometer illustrated in FIG. 6. Oscillator sensing circuit 130 comprises a variable permeability core inductor 118 placed in parallel with Schmitt trigger 120 and a power source (not shown) that provides a Vcc power signal 124. A variable resistor 122 is placed in series with the Vcc supply voltage. In operation, supply voltage 124 provides a DC bias to oscillator circuit 130 that can be adjusted with variable resistor 122 to calibrate the positive and negative trigger points of Schmitt trigger 120. The output frequency of Schmitt trigger 120 is proportional to the inductance of inductor 188 divided by resistance of variable resistor 122. The value of inductance L for inductor 118 varies with the inductor's orientation in a local magnetic field and therefore can provide a change in output frequency 126 of as much as 100%, allowing for very accurate sensing of changes in local magnetic field strength and direction. Again, the use and principles of operation for variable permeability magnetometers are more fully described by U.S. Pat. No. 4,851,775 entitled "Digital Compass and Magnetometer Having a Sensor Coil Wound on a High Permeability Isotropic Core" issued Jul. 25, 1989 to Nam H. Kim et al. which is incorporated above.

The present invention, therefore, provides a novel and unique method and apparatus for the alignment of cathode ray tube video displays in diverse local magnetic fields. The magnetic correction data necessary for image alignment can be generated by a vision system in a measured magnetic field environment. The system can use many of the numerous types of available magnetometers to sense local magnetic field environment and is capable of using either digital or analog measurements to create waveforms, generated in response to magnetic distortion data, to affect the automatic adjustment of a video image on a cathode ray tube 10. Prior methods of cathode ray tube display calibration for local magnetic field distortion have used approximations and design compromises. The method of the present invention senses any local magnetic field and allows for the accurate compensation of magnetically induced distortions in a video image.

The foregoing description of the invention has been presented for purposes of illustration and description. It is not intended to be exhaustive or to limit the invention to the precise form disclosed, and other modifications may be possible in light of the above teachings. For example, production processes and cost constraints may require that production grade magnetometers be produced in a manner that does not require highly accurate alignment on three normal axes. Additionally, the consistency between the alignment of axes of the magnetometers may not be cost justified. Furthermore, the manner in which the magnetometer is attached to the cathode ray tube 10 to ensure alignment of the axes of the magnetometer in any specific direction may also not be cost justified. In each of these cases, or any combination thereof, it may be desirable to place each cathode ray tube 10 in a Helmholtz coil 32 and generate the magnetic correction data for each tube separately such as disclosed in the processes outlined in FIG. 3. In this manner, each cathode ray tube will be calibrated for its own magnetometer. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention, except insofar as limited by the prior art.

What is claimed is:

1. A system for generating locale specific correction factor data for aligning video images on a cathode ray tube monitor in a local magnetic field comprising:
    a processor that generates said locale specific correction factor data by modifying correction factor data with magnetic correction data in response to non-calibrated CRT magnetometer signals that have been correlated to said magnetic correction data that has been generated in calibrated magnetic fields;
    a memory that stores said locale specific correction factor data representative of distortion of said cathode ray tube monitor in said local magnetic field; and,
    monitor circuitry that uses said locale specific correction factor data to generate driver signals for aligning said video images on said cathode ray tube monitor.

2. The system of claim 1 wherein said monitor circuitry further comprises:
    decoders that interpret said locale specific correction factor data and generate correction signals;
    CRT control circuitry that uses said correction signals to generate and apply driver signals to align said video images on said cathode ray tube monitor.

3. An apparatus for dynamically adjusting a video image on a cathode ray tube to correct magnetic distortion caused by a local magnetic field by using locale specific correction factor data that is generated from magnetic correction data and correction factor data comprising:
    means for measuring said local magnetic field and generating magnetic field strength signals;
    means for using said magnetic field strength signals, said magnetic correction data and correction factor data to generate locale specific correction factor data; and,
    means for generating driver signals in response to said locale specific correction factor data to dynamically adjust said video image.

4. An apparatus for dynamically adjusting a video image on a cathode ray tube to correct magnetic distortion caused by a local magnetic field by using locale specific correction factor data that is generated from magnetic correction data and correction factor data comprising:
    a CRT magnetometer that measures said local magnetic field and generates noncalibrated magnetic field strength signals;
    a processor that retrieves magnetic correction data representative of the amount of correction that is required for a plurality of correction factor parameters in a plurality of magnetic fields, and modifies correction factor data with said magnetic correction data to generate locale specific correction factor data; and,
    monitor circuitry that generates driver signals in response to said locale specific correction factor data to align said cathode ray video displays.

5. The system of claim 4 further comprising a memory that stores said magnetic correction data as magnetic gain matrix table that includes magnetic correction data for said non-calibrated magnetic field strength signals that indicates how said correction factor data can be altered to compensate for interaction between said plurality of correction factor parameters to adjust for changes in magnetic field strength of said local magnetic field.

6. The system of claim 4 further comprising a memory that stores said magnetic correction data as at least one magnetic correction data formula that is a mathematical representation of the manner in which said plurality of correction factor parameters vary as a function of changes in said local magnetic field.

7. The system of claim 4 wherein said CRT magnetometer comprises a variable permeability inductor magnetometer.

8. A method of using magnetic correction data and correction factor data to produce locale specific correction factor data that is used to correct magnetic distortion produced in a cathode ray tube by local magnetic field comprising the steps of:
    measuring said local magnetic field using a CRT magnetometer to produce noncalibrated magnetic field strength signals;
    retrieving magnetic correction data that corresponds to said noncalibrated magnetic field strength signals; and,
    modifying said correction factor data with said magnetic correction data to produce said locale specific correction factor data.

9. The method of claim 8 further comprising the step of:
    generating driver signals from said locale specific correction factor data to align said cathode ray tube.

10. The method of claim 9 wherein said step of retrieving magnetic correction data further comprises the step of:
    producing said magnetic correction data using a magnetic gain matrix table and said noncalibrated magnetic field strength signals.

11. The method of claim 9 wherein said step of retrieving magnetic correction data further comprises the step of:
    producing said magnetic correction data using at least one magnetic correction data formula and said noncalibrated magnetic field strength signals.

12. A system for aligning video images on a cathode ray tube in various local magnetic fields comprising:
  a CRT magnetometer that measures said various local magnetic fields and generates noncalibrated magnetic field strength signals;
  a processor that:
    retrieves magnetic correction data that is produced by generating a plurality of predetermined magnetic field strength signals and measuring the amount of correction required for each correction factor parameter of a plurality of correction factor parameters to produce an aligned video image, said magnetic correction data retrieved in response to said noncalibrated magnetic field strength signals that have been correlated to said magnetic correction data during generation of said predetermined magnetic field strength signal; and,
    modifies correction factor data with said magnetic correction data to produce locale specific correction factor data;
  monitor circuitry that generates driver signals from said locale specific correction factor data and applies said driver signals to said cathode ray tube to align said video images on said cathode ray tube.

13. The system of claim 12 wherein said processor further comprises:
  a memory that stores said magnetic correction data in the form of a magnetic gain matrix table; and,
  a logic device that uses said magnetic correction data to modify said correction factor data to generate said locale specific correction factor data.

14. The system of claim 13 wherein said monitor circuitry comprises:
  at least one decoder that transforms said locale specific correction factor data into decoded correction signals; and,
  control circuitry that generates said driver signals in response to said decoded correction signals.

15. The system of claim 12 wherein said CRT magnetometer comprises:
  a variable permeability inductor for each axis of measurement;
  an oscillator that generates a time variable signal for each variable permeability inductor; and,
  a variable resistor that sets the frequency of each variable permeability inductor and oscillator pair.

16. A method of generating an aligned video image on a cathode ray tube comprising the steps of:
  generating locale specific correction factor data from magnetic correction data and correction factor data;
  decoding said locale specific correction factor data to produce correction signals; and,
  using said correction signals to produce said aligned video image on said cathode ray tube.

17. The method of claim 16 further comprising the step of storing said magnetic correction data on a nonvolatile storage device mounted on said cathode ray tube.

18. The method of claim 16 further comprising the step of storing said magnetic correction data on a storage disk.

19. The method of claim 16 further comprising the step of storing said correction factor data in a characterization module.

20. The method of claim 16 wherein said step of generating locale specific correction factor data comprises the steps of:
  producing magnetic correction data from a magnetic gain matrix table and measured local magnetic fields; and,
  modifying said correction factor data using said magnetic correction data to produce said locale specific correction factor data.

21. The method of claim 16 wherein said step of generating locale specific correction factor data comprises the steps of:
  producing magnetic correction data from at least one magnetic correction data formula and measured local magnetic fields; and,
  modifying said correction factor data using said magnetic correction data to produce said locale specific correction factor data.

22. A system for for aligning video images on a cathode ray tube monitor in a local magnetic field comprising:
  a CRT magnetometer that generates non-calibrated magnetic field strength signal representative of said local magnetic fields;
  a memory that stores magnetic correction data that is correlated with said non-calibrated magnetic field strength signals;
  a processor that retrieves said magnetic correction data in response to said non-calibrated magnetic field strength signals to align said video images on said cathode ray tube monitor.

* * * * *